(12) United States Patent
Abbott et al.

(10) Patent No.: US 10,705,765 B2
(45) Date of Patent: Jul. 7, 2020

(54) MANAGING POINT-IN-TIME COPIES FOR EXTENTS OF DATA

(71) Applicant: INTERNATIONAL BUSINESS MACHINES CORPORATION, Armonk, NY (US)

(72) Inventors: Richard M. Abbott, Tucson, AZ (US); Theresa M. Brown, Tucson, AZ (US); Preston A. Carpenter, Vail, AZ (US); Ben Esparza, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/197,292

(22) Filed: Nov. 20, 2018

(65) Prior Publication Data

US 2019/0087095 A1    Mar. 21, 2019

Related U.S. Application Data

(63) Continuation of application No. 15/240,996, filed on Aug. 18, 2016, now Pat. No. 10,235,099.

(51) Int. Cl.
*G06F 3/06* (2006.01)
*G06F 11/14* (2006.01)

(52) U.S. Cl.
CPC .............. *G06F 3/067* (2013.01); *G06F 3/065* (2013.01); *G06F 3/0611* (2013.01); *G06F 11/1451* (2013.01); *G06F 2201/84* (2013.01)

(58) Field of Classification Search
CPC ........ G06F 3/0619; G06F 3/065; G06F 3/067; G06F 3/0614; G06F 3/0646; G06F 3/064; G06F 11/1451; G06F 11/1448; G06F 11/1446; G06F 11/1458; G06F 11/1469; G06F 2201/84

See application file for complete search history.

(56) References Cited

U.S. PATENT DOCUMENTS

| 6,101,585 | A | * | 8/2000 | Brown | ................ G06F 11/1451 711/162 |
| 6,434,681 | B1 | | 8/2002 | Armangau | |
| 7,747,576 | B2 | | 6/2010 | Micka | |

(Continued)

OTHER PUBLICATIONS

U.S. Appl. No. 15/240,996, filed Aug. 16, 2016, (18.645).

(Continued)

*Primary Examiner* — Michael Krofcheck
(74) *Attorney, Agent, or Firm* — David W. Victor; Konrad Raynes Davda & Victor LLP

(57) ABSTRACT

Provided are a computer program product, system, and method for managing point-in-time copies for extents of data. A point-in-time copy for at least one range of extents in at least one volume for a point-in-time copy identifier is established. Change recording information is generated indicating each of the at least one range of extents less than all of the extents in the at least one volume. An update to data in the at least one range of extents in the point-in-time copy is received and data in the source storage in the at least one range of extents to be updated is copied as changed data to the target storage. Indication is made in the change recording information of the data in the at least one range of extents that has been updated.

23 Claims, 11 Drawing Sheets

(56) References Cited

U.S. PATENT DOCUMENTS

| | | | |
|---|---|---|---|
| 8,051,259 | B2 | 11/2011 | Agombar et al. |
| 8,725,972 | B2 | 5/2014 | Hutchison et al. |
| 9,081,511 | B2 | 7/2015 | Benhase et al. |
| 9,635,132 | B1 | 4/2017 | Lin et al. |
| 10,013,313 | B2* | 7/2018 | Zhang ............... G06F 11/1464 |
| 2003/0158869 | A1 | 8/2003 | Micka |
| 2004/0103104 | A1 | 5/2004 | Hara et al. |
| 2005/0086432 | A1 | 4/2005 | Sakai |
| 2006/0080503 | A1 | 4/2006 | Araki et al. |
| 2009/0006496 | A1 | 1/2009 | Shoens et al. |
| 2011/0161299 | A1* | 6/2011 | Prahlad ............... G06F 9/4856 707/649 |
| 2012/0179655 | A1 | 7/2012 | Beatty et al. |
| 2012/0216009 | A1 | 8/2012 | Benhase et al. |
| 2013/0007389 | A1 | 1/2013 | Patterson et al. |
| 2015/0324280 | A1 | 11/2015 | Carpenter et al. |
| 2016/0004453 | A1* | 1/2016 | Ben-Tsion ............ G06F 3/065 711/162 |
| 2016/0070652 | A1 | 3/2016 | Sundararaman et al. |
| 2016/0077923 | A1* | 3/2016 | Zhang ............... G06F 16/1844 707/645 |
| 2016/0259574 | A1 | 9/2016 | Carpenter et al. |
| 2017/0031769 | A1* | 2/2017 | Zheng ............... G06F 11/1446 |
| 2018/0052616 | A1 | 2/2018 | Abbott et al. |
| 2018/0052617 | A1 | 2/2018 | Abbott et al. |

OTHER PUBLICATIONS

Office Action dated Dec. 22, 2017, pp. 20, for U.S. Appl. No. 15/240,996, filed Aug. 16, 2016, (18.645).

Response to Office Action, dated Mar. 22, 2018, for U.S. Appl. No. 15/240,996 (18.645), filed Aug. 16, 2016, Total 16 pages.

Final Office Action dated Jun. 28, 2018, pp. 21, for U.S. Appl. No. 15/240,996 (18.645), filed Aug. 16, 2016.

Response dated Sep. 5, 2018, pp. 8, to Final Office Action dated Jun. 28, 2018, pp. 21, for U.S. Appl. No. 15/240,996 (18.645).

Notice of Allowance dated Sep. 19, 2018, pp. 6, for U.S. Appl. No. 15/240,996 (18.645).

U.S. Appl. No. 15/241,000, filed Aug. 16, 2016, (18.669).

Office Action dated Dec. 21, 2017, pp. 20, for U.S. Appl. No. 15/241,000, filed Aug. 16, 2016, (18.669).

Response to Office Action, dated Mar. 21, 2018, for U.S. Appl. No. 15/241,000 (18.669), filed Aug. 16, 2016, Total 15 pages.

Final Office Action dated Jun. 28, 2018, pp. 19, for U.S. Appl. No. 15/241,000, (18.669).

Response dated Sep. 9, 2018, pp. 13, to Final Office Action dated Jun. 28, 2018, pp. 19, for U.S. Appl. No. 15/241,000, (18.669).

Notice of Allowance dated Sep. 24, 2018, pp. 9, for U.S. Appl. No. 15/241,000 , (18.669).

List of IBM Patents or Patent Applications Treated as Related dated Nov. 20, 2018, pp. 2.

* cited by examiner

Point-in-Time Copy Information

Changed Data

Point-in-Time Copy Establish Command

Incremental Point-in-Time Copy Command

MANAGING POINT-IN-TIME COPIES FOR EXTENTS OF DATA

BACKGROUND OF THE INVENTION

1. Field of the Invention

The present invention relates to a computer program product, system, and method for managing point-in-time copies for extents of data.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When an update to a block in the source volume involved in a point-in-time copy relationship is received, the copy of the track as of the point-in-time must be copied to a side file or the target volume before the new data for the track is written to the source volume, overwriting the point-in-time copy of the data.

SUMMARY

Provided are a computer program product, system, and method for managing point-in-time copies for extents of data. A point-in-time copy for at least one range of extents in at least one volume for a point-in-time copy identifier is established. Change recording information is generated indicating each of the at least one range of extents less than all of the extents in the at least one volume. An update to data in the at least one range of extents in the point-in-time copy is received and data in the source storage in the at least one range of extents to be updated is copied as changed data to the target storage. Indication is made in the change recording information of the data in the at least one range of extents that has been updated.

DETAILED DESCRIPTION

Described embodiments provide techniques for establishing a point-in-time copy for at least one range of extents comprising a subset of the extents in a volume to allow a more targeted point-in-time copy that does not include those extents in a volume not of interest to the user. Described embodiments allow a host to specify various extent ranges in at least one volume to a storage controller to participate in a point-in-time copy relationship, such as an incremental FlashCopy relationship. After an extent level point-in-time copy is established, the extent ranges in the point-in-time copy are monitored for incoming updates. Updated data in extents in a point-in-time copy are copied to changed data in a target storage and change recording information is updated to indicate the data in the extents that have been modified. Further, with described embodiments, the host may modify the ranges of extents provided for a point-in-time copy.

Described embodiments provide advantages over current point-in-time copy solutions that require the point-in-time copy be performed with respect to an entire volume. Described embodiments optimize point-in-time copy configuration for users having files of interest that span a subset of extents within one or more volumes.

Figure 1:
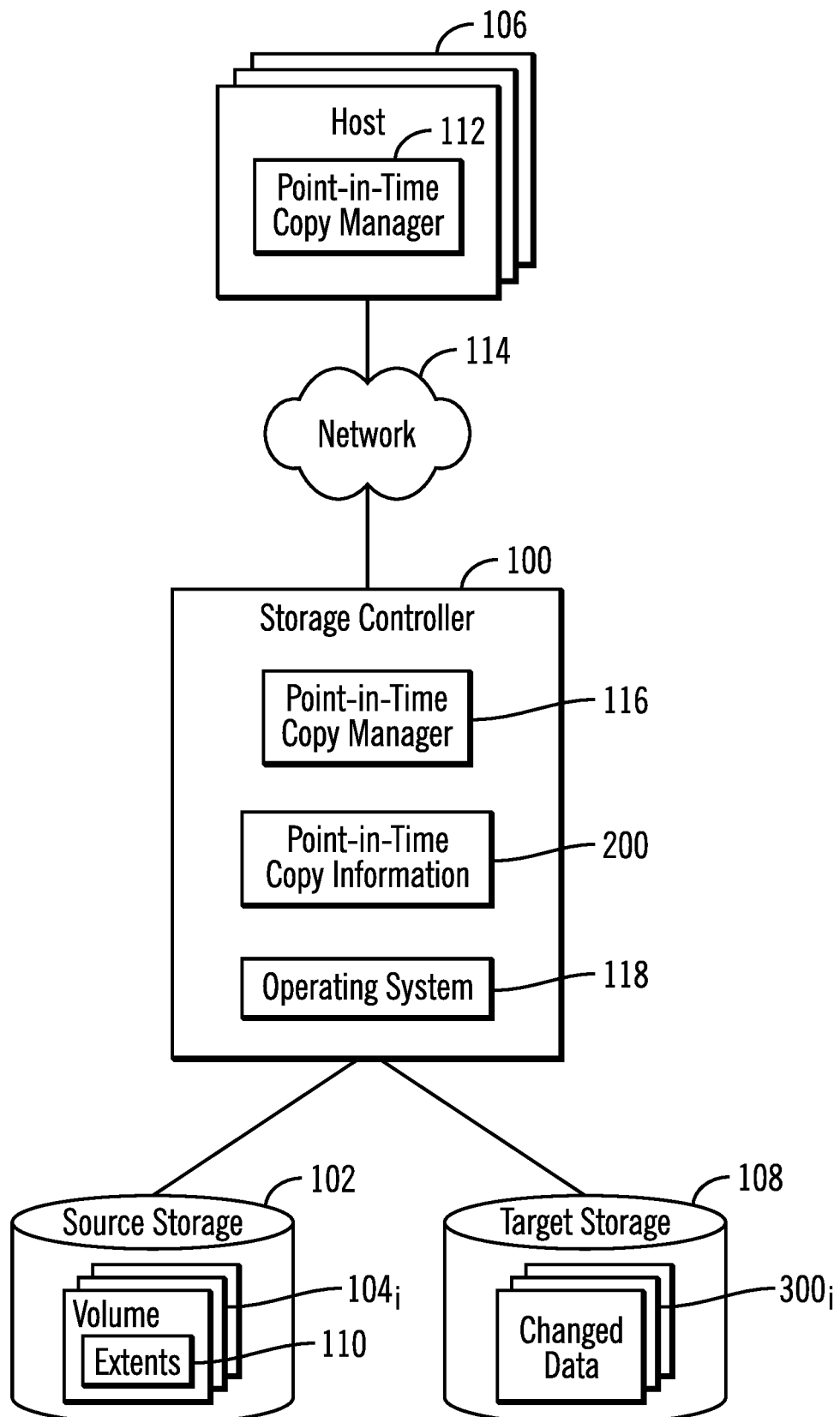
FIG. 1 illustrates an embodiment of a storage environment.

FIG. 1 illustrates an embodiment of a data storage environment having a storage controller 100 managing access to a source storage 102 that includes source volumes $104_i$, such as a production volume used by different host systems 106, and a target storage 108. The volumes $104_i$ are comprised of extents 110 of contiguous tracks. A host system 106 includes a point-in-time copy manager program 112 to establish point-in-time copies at the storage controller 100, such as FlashCopy, snapshot, etc. The storage controller 100 and hosts 106 may communicate over a network 114.

The storage controller 100 includes a point-in-time copy manager 116 to create point-in-time copies of data in the source storage 102, e.g., FlashCopy, snapshot, etc. When creating a point-in-time copy, the point-in-time copy manager 116 generates point-in-time copy information 200 on the point-in-time copy created as of a point-in-time. The storage controller 100 further includes an operating system 118, including the code and logic to manage Input/Output ("I/O") requests to the source storage 102. The operating system 118 may configure the source storage 102 and target storage 108 in one or more volumes $104_i$ and data, such as tracks or logical block addresses (LBAs), grouped in extents. Extents 110 may comprise any grouping of tracks or data units in storage. The point-in-time copy manager 116 may be a copy service supplied with the operating system 118.

The target storage 108 includes changed data $300_i$ comprising data for tracks in the source storage in extents 110 included in a point-in-time copy that are updated to provide the updated tracks as of the point-in-time before they data is updated.

The storages 102 and 108 may store tracks in a Redundant Array of Independent Disks (RAID) configuration where strides of tracks are written across multiple storage devices comprising the storages 102 and 108. The storages 102 and 108 may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network 114 may comprise a network such as one or more interconnected Local Area Networks (LAN), Storage Area Networks (SAN), Wide Area Network (WAN), peer-to-peer network, wireless network, etc.

The point-in-time copy manager 116 performs a point-in-time copy operation that creates a copy of specified extents in a manner that appears instantaneous and allows a process to continue accessing the extents subject to the point-in-time copy while actual data transfers of the copied data are deferred to a later time. The point-in-time copy appears instantaneous because complete is returned to the copy operation in response to generating the relationship data structures, such as the point-in-time copy information 200 and change recording information, without copying the data.

The point-in-time copy managers 112, 116 may use the point-in-time copy information 200 to restore the source data to different point-in-times represented in the point-in-time copy information 200.

In FIG. 1, the point-in-time copy managers 112 and 116 are shown as implemented in separate computing systems, a host 106 and storage controller 100. In alternative embodiments, the point-in-time copy managers 112 and 116 may be implemented on a same computer system and operating system. Still further, the point-in-time copy managers 112 and 116 may be modules within a single deployed computer program installed on a single computer system/operating system.

Figure 2:
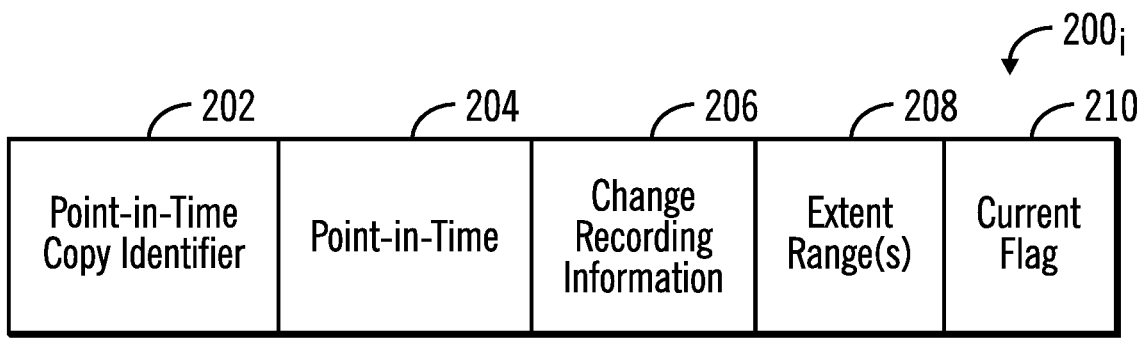
FIG. 2 illustrates an embodiment of point-in-time copy information.

FIG. 2 illustrates an instance of the point-in-time copy information $200_i$, also referred to as a point-in-time copy, which may comprise information maintained for the storage controller point-in-time copy information 200, and may include a point-in-time copy identifier 202 identifying a point-in-time copy and that may be created by the host point-in-time copy manager 112; a point-in-time 204 of the point-in-time copy 202, such that data for the point-in-time copy information $200_i$ is consistent as of that point-in-time 204; change recording information 206 indicating which data or tracks in the source data 102 has changed since the point-in-time 204, which may comprise a bitmap having a bit for each data unit (e.g., track) that is set to one of two values indicating the data or track represented by the bit has or has not been updated since the point-in-time 204; one or more ranges of extents 208, where each range includes one or more extents 110, and where the extent ranges 208 may comprise extents 110 in one or more volumes $104_i$ and comprise a subset of the extents 110 in the one or more volumes $104_i$ in which they are included; and a current flag 210 indicating whether the information $200_i$ is for the current point-in-time copy currently recording information on changes to the tracks in the extents 208 or an archived point-in-time copy. In alternative embodiments, the current point-in-time copy may be determined by determining the point-in-time copy instance $200_i$ having a most current point-in-time 204.

Figure 3:
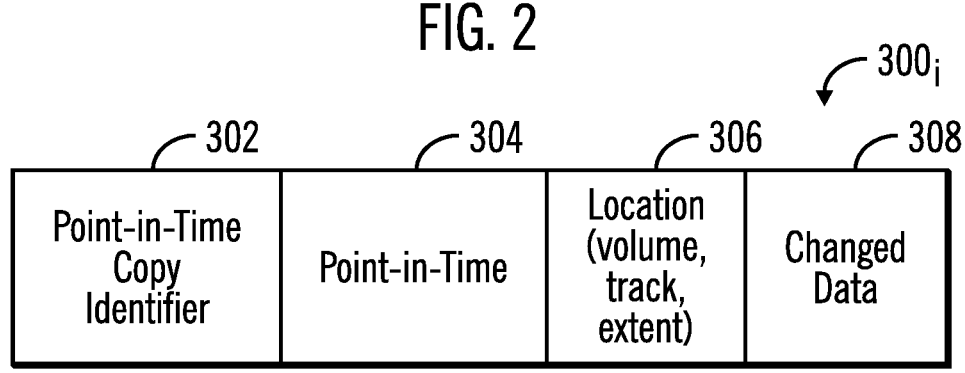
FIG. 3 illustrates an embodiment of changed data.

FIG. 3 illustrates an instance of changed data $300_i$ for modified data in the target storage 108 as part of a point-in-time copy, and may include the point-in-time copy identifier 302 providing a unique identifier for the point-in-time copy provided by the host 106 for which the changed data is provided; a point-in-time 304 of the changed data 308 that is copied over before being updated at the source storage 102; and location 306 of the updated changed data in the source storage 102, such as volume, extent, track; and the changed data 308 as of the point-in-time or location of the changed data in the target storage 108 as of the point-in-time 304. The changed data 308 may be stored in the target storage 108 in a volume, extent and track layout matching that of the source volume, extent and track subject to the copy relationship or in a changed data log.

Figure 4:
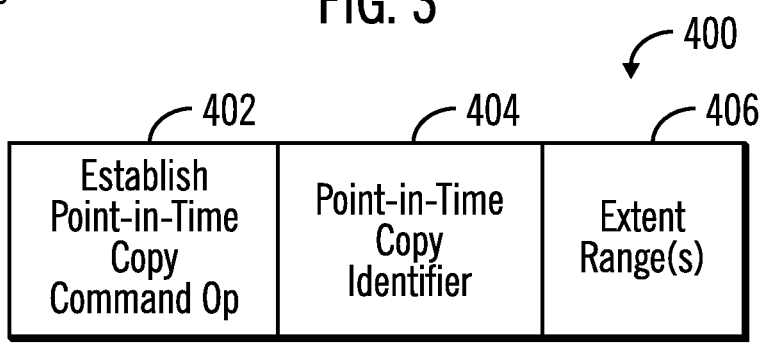
FIG. 4 illustrates an embodiment of an establish point-in-time copy command.

FIG. 4 illustrates an embodiment of a point-in-time copy establish command 400 the host point-in-time copy manager 112 sends to the storage controller 100 to establish a point-in-time copy $200_i$ for at least one range of extents, and includes an establish point-in-time copy command operation code 402; a unique point-in-time copy identifier 404 that may be generated by the host point-in-time copy manager 112; and at least one range of extents 406 in at least one volume $104_i$, comprising a subset or less than all the extents 110 in the at least one volume $104_i$ including the extents 406.

Figure 5:
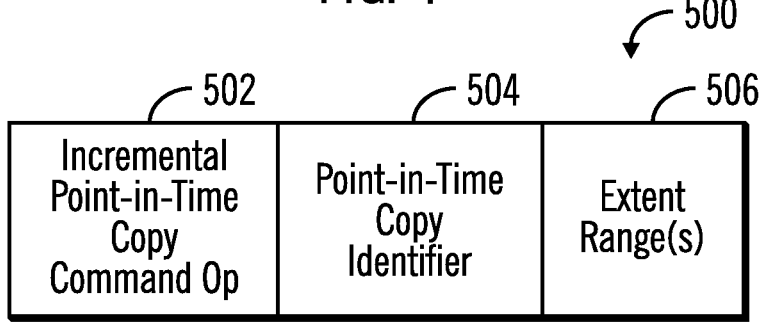
FIG. 5 illustrates an embodiment of an incremental point-in-time copy command.

FIG. 5 illustrates an embodiment of an incremental point-in-time copy command 500 the host point-in-time copy manager 112 generates to create an additional point-in-time copy for the point-in-time copy identifier previously the subject of a point-in-time copy establish command 400 or previous incremental point-ion-time copy command 500. The incremental point-in-time copy command 500 may include an incremental point-in-time copy command operation code 502; a point-in-time copy identifier 504 used to uniquely identify a point-in-time copy; and extent ranges 506 of at least one extent of tracks, where the extent ranges 506 may comprise a modification to the extent ranges 406 in the establish command 400 or in a previous incremental point-in-time copy command 500. The extent ranges 506 may remove or add extents to the extent ranges 208 previously set for the current point-in-time copy $200_i$ for the point-in-time copy identifier. Alternatively, the extent ranges 506 may indicate that there is no change to the current extents associated with the point-in-time copy identifier 504. In such case, the incremental point-in-time copy command 500 is used to create a new point-in-time copy for a new point-in-time and cause archiving of the current point-in-time copy to allow for use for restoring data.

In FIGS. 4 and 5, the host point-in-time copy manager 112 may create the unique point-in-time copy identifier 404, 504 to use to establish a point-in-time copy as associated with one or more extents of a volume, less than a volume, to subject to a copy relationship, and then use that same point-in-time copy identifier to initiate an additional point-in-time copy or incremental copy and/or change the extents subject to the point-in-time copy identified by the point-in-time copy identifier. In an alternative embodiment, the point-in-time copy identifier 504 may be generated by a different component in the host 106 or the storage controller 100.

Figure 6:
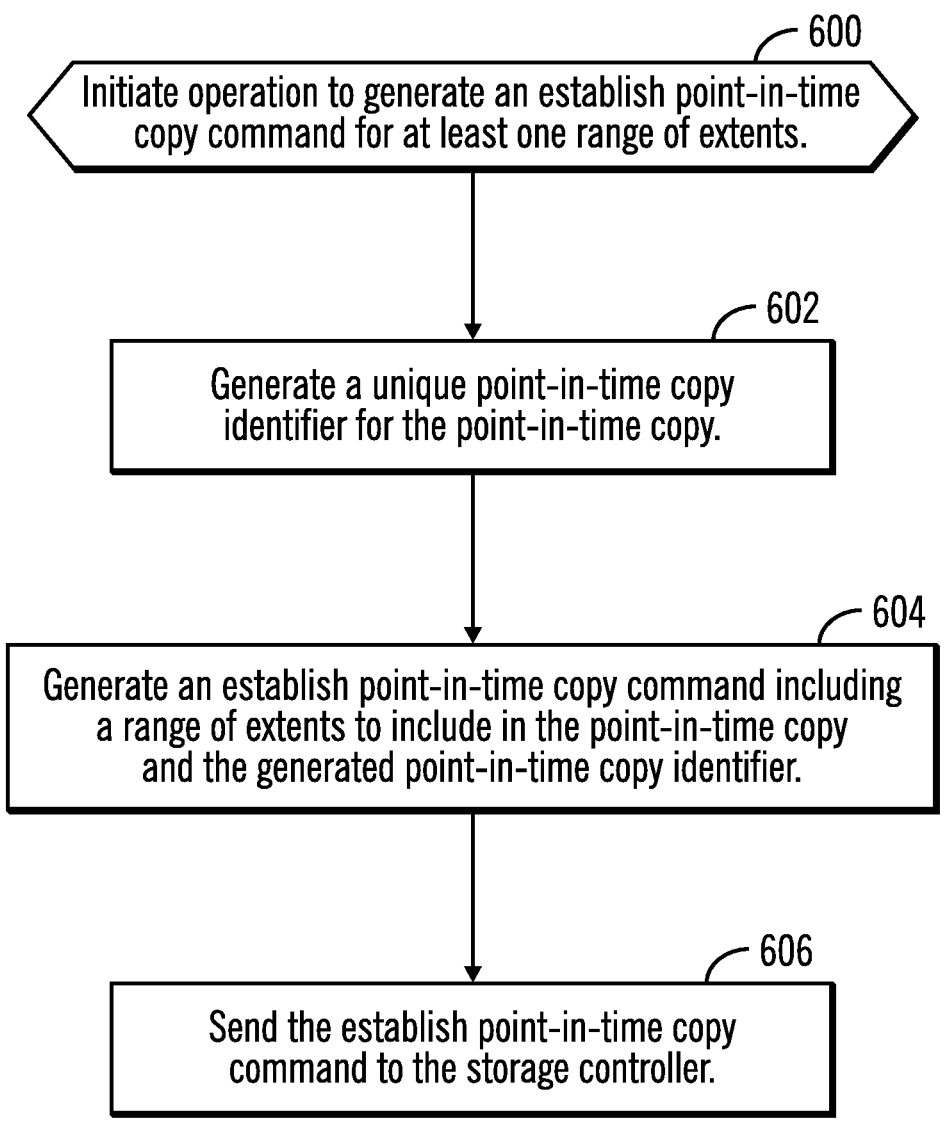
FIG. 6 illustrates an embodiment of operations to generate an establish point-in-time copy command.

FIG. 6 illustrates an embodiment of operations performed by the host point-in-time copy manager 112 to generate a point-in-time copy establish command 400. Upon initiating (at block 600) an operation to generate an establish point-in-time copy command 400, the host point-in-time copy manager 112 generates (at block 602) a unique point-in-time copy identifier 404. The host point-in-time copy manager 112 generates (at block 604) an establish point-in-time copy command 400 including the establish point-in-time copy operation code 402, the generated point-in-time copy identifier 404, and a range of extents 406 to include in the point-in-time copy. The generated establish point-in-time copy command 400 is sent (at block 606) to the storage controller 100.

Figure 7:
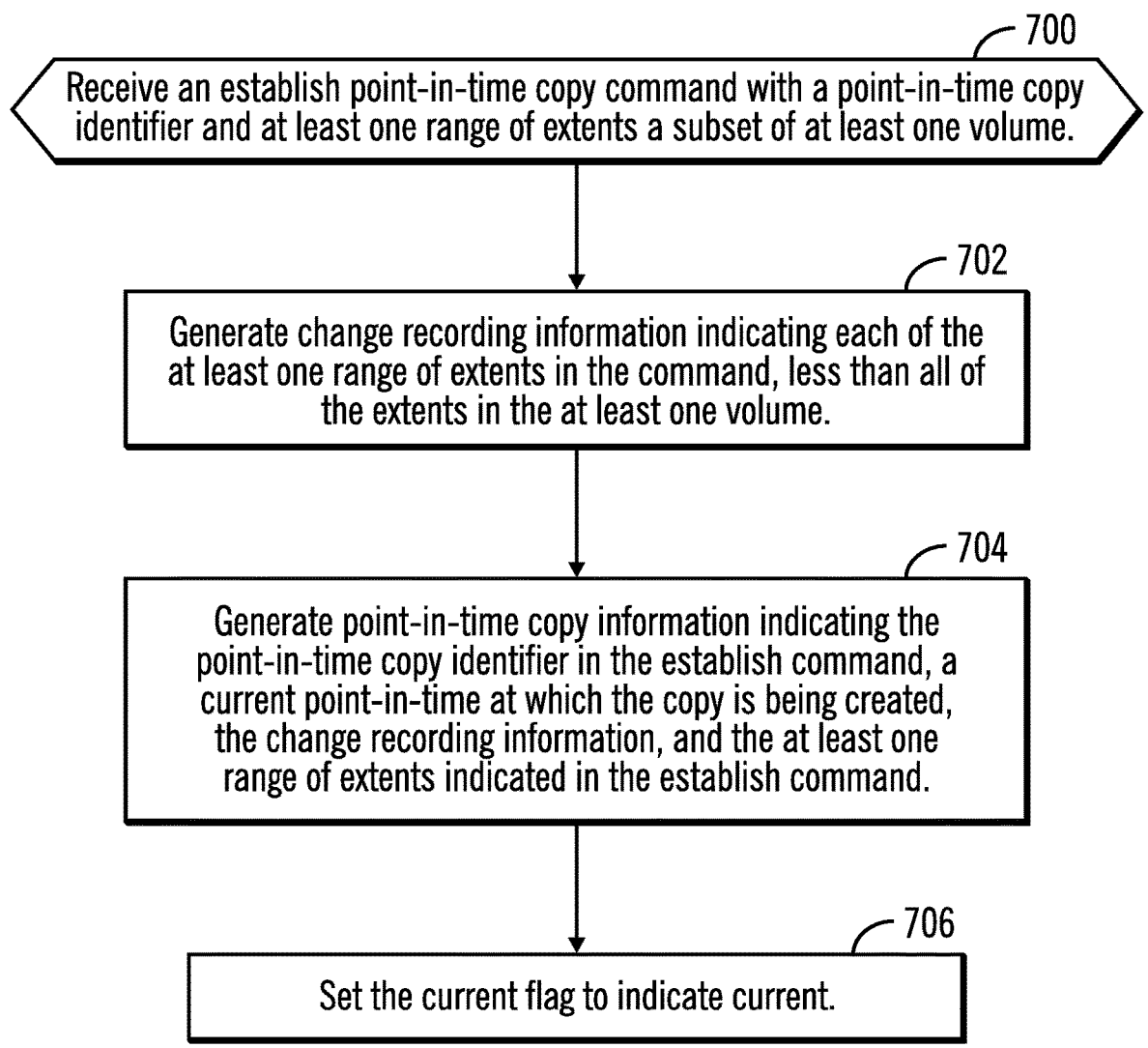
FIG. 7 illustrates an embodiment of operations to process the establish point-in-time copy command to establish a point-in-time copy.

FIG. 7 illustrates an embodiment of operations performed by the storage controller 100 point-in-time copy manager 116 to process a received establish point-in-time copy command 400. Upon receiving (at block 700) the command 400, the point-in-time copy manager 116 generates (at block 702) change recording information 206 indicating the tracks in each of the at least one range of extents 406 indicated in the received establish command 400. The change recording information 206 may only include bits or information for the specified extents 406 and not non-specified extents in the at least one volume including the extents 406. In this way, the change recording information 206 conserves space by only providing information, or including bits, for those extents 406 subject to the point-in-time copy. The point-in-time copy manager 116 generates point-in-time copy information $200_i$ indicating the point-in-time copy identifier 402 in the received establish command 400, a current point-in-time 204 at which the copy is being created, the generated change recording information 206, and the at least one range of extents 208 indicated in the establish command 400. The current flag 210 is set (at block 706) to indicate the generated point-in-time copy information $200_i$ is the current point-in-time copy. As mentioned other mechanisms than a current flag 210 may be used to indicate a current point-in-time copy.

Figure 8:
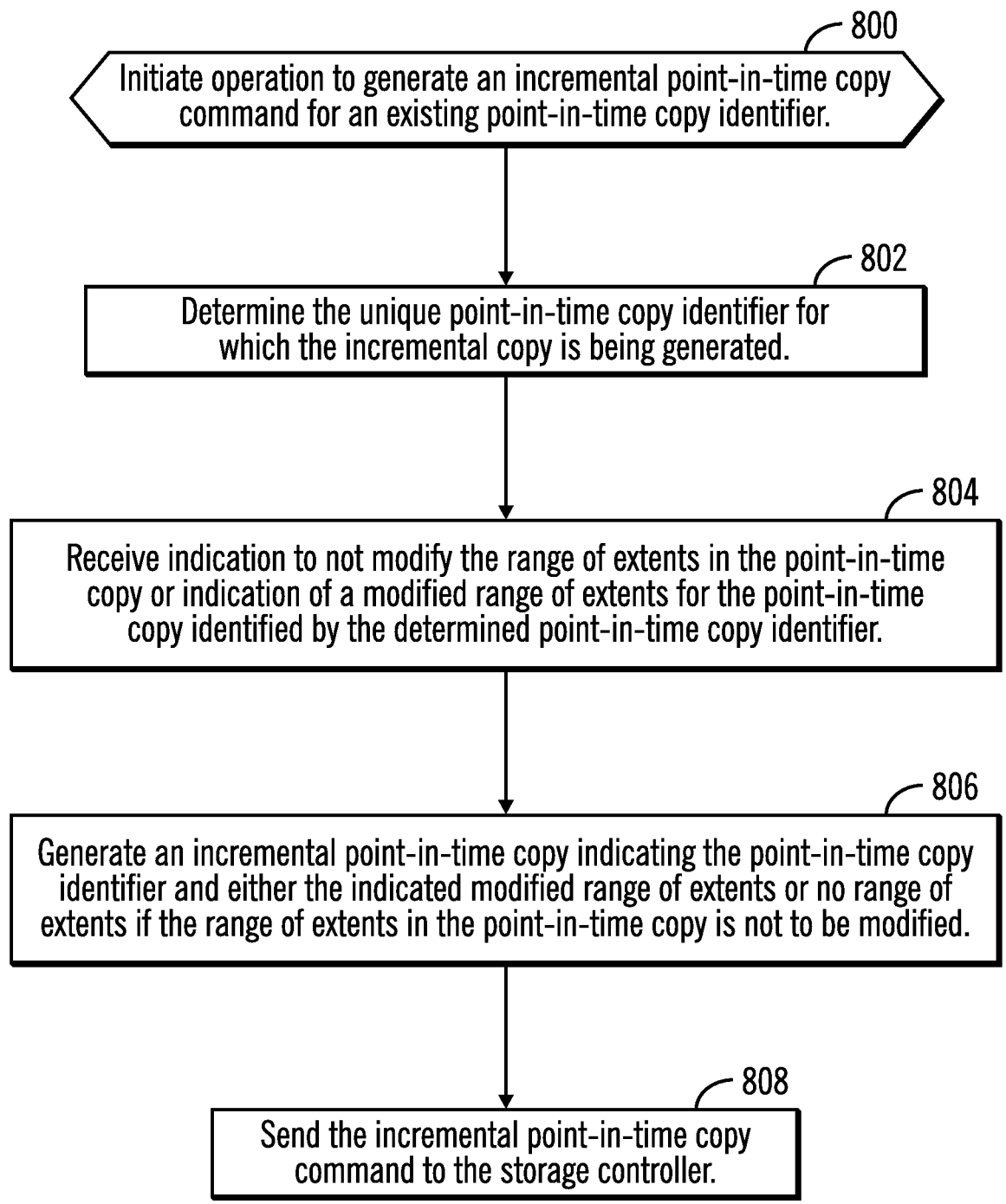
FIG. 8 illustrates an embodiment of operations to generate an incremental point-in-time copy command.

FIG. 8 illustrates an embodiment of the host point-in-time copy manager 112 to generate an incremental point-in-time copy command 500. Upon initiating (at block 800) an operation to generate an incremental point-in-time copy command 500 for an existing point-in-time copy identifier, the host point-in-time copy manager 112 determines (at block 802) the unique point-in-time copy identifier for which the incremental copy is being generated. The point-in-time copy manager 112 receives (at block 804) indication to not modify the range of extents in the point-in-time copy or indication of a modified range of extents for the point-in-time copy identified by the determined point-in-time copy identifier. The host point-in-time copy manager 112 generates (at block 806) an incremental point-in-time copy command 500 indicating the incremental point-in-time copy operation code 502, the determined point-in-time copy identifier 504, and in field 506 either the indicated modified range of extents to modify or indication of no range of extents if the range of extents in the point-in-time copy for the point-in-time copy identifier 504 is not to be modified and remain unchanged. The generated incremental point-in-time copy command 500 is sent (at block 808) to the storage controller 100 to process.

Figure 9A:
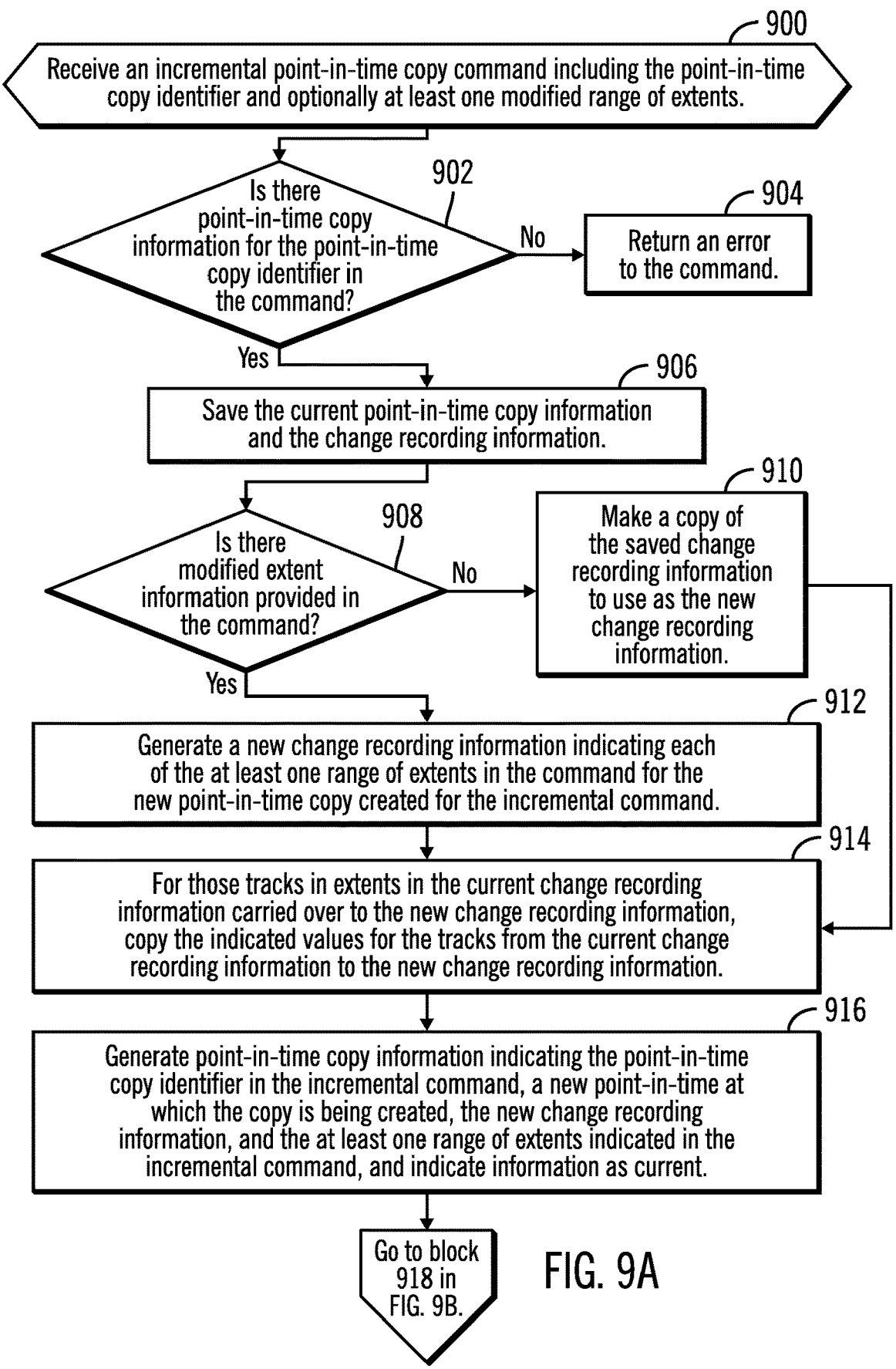
FIGS. 9a and 9b illustrate an embodiment of operations to process the incremental point-in-time copy command to create an incremental point-in-time copy command.
Figure 9B:
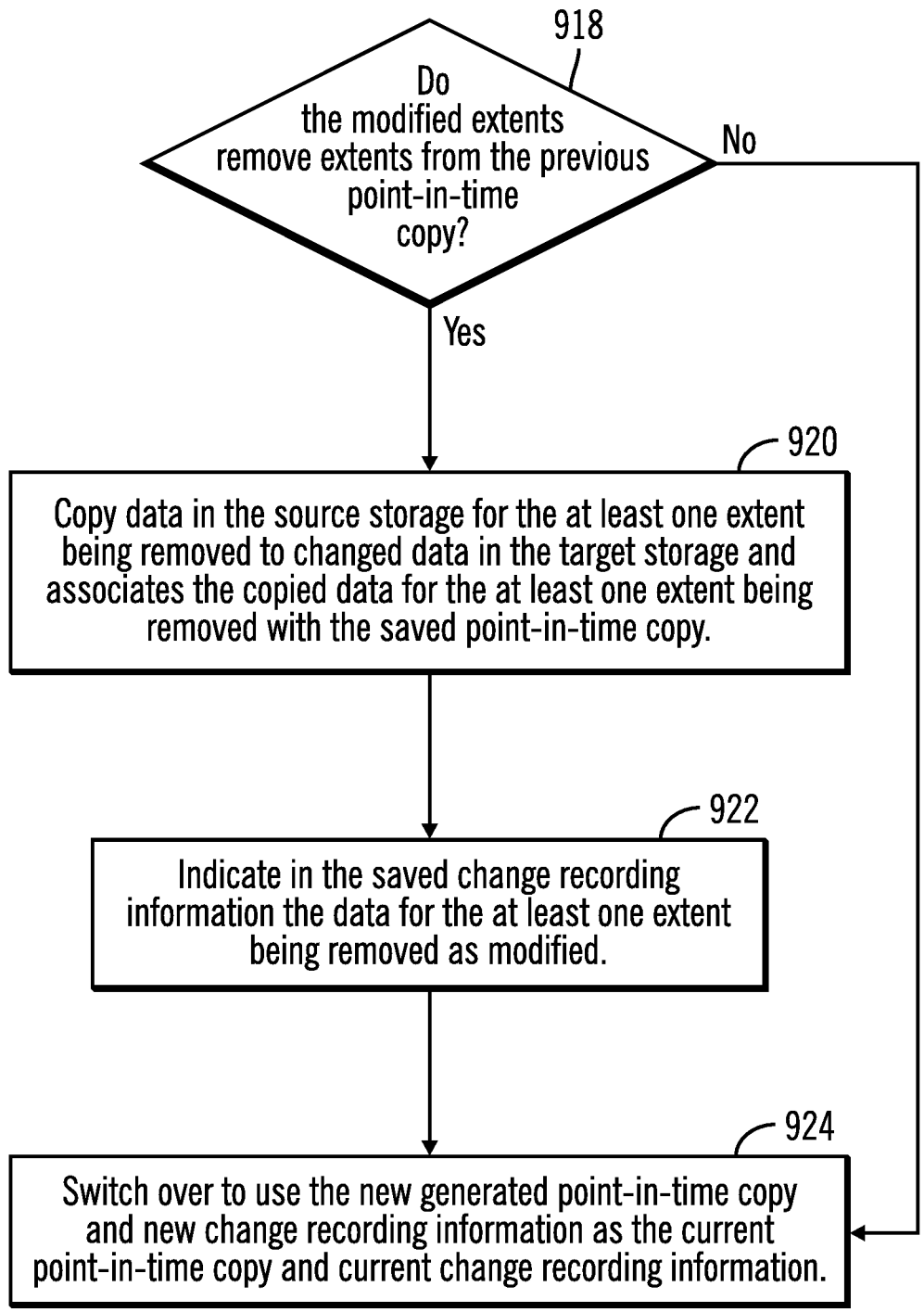

FIGS. 9a and 9b illustrate an embodiment of operations performed by the point-in-time copy manager 116 to process an incremental point-in-time copy command 500 received from a host 106 to establish a new incremental point-in-time copy for the point-in-time copy identifier used in a previous establish command 400 or previous incremental point-in-time copy command 500. Upon receiving (at block 900) the incremental point-in-time copy command 500 including the point-in-time copy identifier 504 and optionally modified extent ranges 506, if (at block 902) there is no point-in-time copy information $200_i$ for the point-in-time copy identifier 504 in the command 500, an error returned (at block 904) to the host 106 initiating the received command 500. If (at block 902) there is point-in-time copy information $200_i$ for the point-in-time copy identifier 504, then the point-in-time copy manager 116 saves (at block 906) the current point-in-time copy information $200_i$ and the change recording information 206 in the source storage 102, target storage 108 or other location.

If (at block 908) the command 500 does not include modified extent ranges 506, then the point-in-time copy manager 116 makes (at block 910) a copy of the saved change recording information $206_i$ for the previous point-in-time $204_i$ to use as the new change recording information $206_{i+1}$ for the next point-in-time $204_{i+1}$. If (at block 908) the command 500 does include modified extent ranges 506, then the point-in-time copy manager 116 generates (at block 912) new change recording information $206_{i+1}$ indicating each of the at least one range of extents 506 in the command 500. From blocks 910 or 912, for those tracks in extents in the change recording information $206_i$ for the current point-in-time $204_i$ carried over to the new change recording information $206_{i+1}$, the point-in-time copy manager 116 copies (at block 914) the indicated values for the tracks from the current change recording information $206_i$ to the new change recording information $206_{i+1}$. The point-in-time copy manager 116 generates (at block 916) point-in-time copy information $200_{i+1}$ for the new point-in-time copy indicating the point-in-time copy identifier 504 in the incremental command 500, a new point-in-time $204_{i+1}$ at which the copy is being created, the new change recording information $206_{i+1}$, the at least one range of extents $208_{i+1}$ indicated in the incremental command 500 or the previous used range of extents, and sets the current flag 210 to indicate the new generated point-in-time copy information $200_{i+1}$ as current. The current flag 210 for the previous point-in-time copy $200_i$ may be reset to indicate that the previous point-in-time copy $200_i$ is not the most current point-in-time copy. Control then proceeds to block 918 in FIG. 9b.

At block 918, if the modified at least one range of extents 506 removes extents from the extents $208_i$ previous point-in-time copy $200_i$, then the point-in-time copy manager 116 copies (at block 920) data in the source storage 102 for the at least one extent being removed to the target storage 108 and associates the copied data as changed data $300_i$ for the at least one extent being removed with the saved point-in-time copy 304, and the location 306 in the source storage 102 from which the data is copied. The point-in-time copy manager 116 indicates (at block 922) in the saved change recording information $206_i$ the data for the at least one extent being removed as modified. If (at block 918) extents are not being removed in the modified extents 506 with the incremental command 500 (from the no branch of block 918) or after block 922, the point-in-time copy manager 116 switches over (at block 924) to use the new generated point-in-time copy $200_{i+1}$ and new change recording information $206_{i+1}$ as the current point-in-time copy and current change recording information. In alternative embodiments, the operations of blocks 918, 920, and 922 may not be performed to not save the data with the current point-in-time copy $200_i$ for extents being removed in the modified extents $208_{i+1}$ in the new point-in-time copy $200_{i+1}$ With the operations of FIGS. 8, 9a and 9b, the ranges of extents being monitored for a point-in-time copy identified by point-in-time copy identifier may be modified to specify a different range of extents for the point-in-time copy of the copy identifier, which ranges of extents are a subset of the one or more volumes including the extents. The incremental point-in-time copy command 500 further causes the storage controller 100 to create a new point-in-time copy at a new point-in-time for purposes of creating an additional incremental backup.

Figure 10:
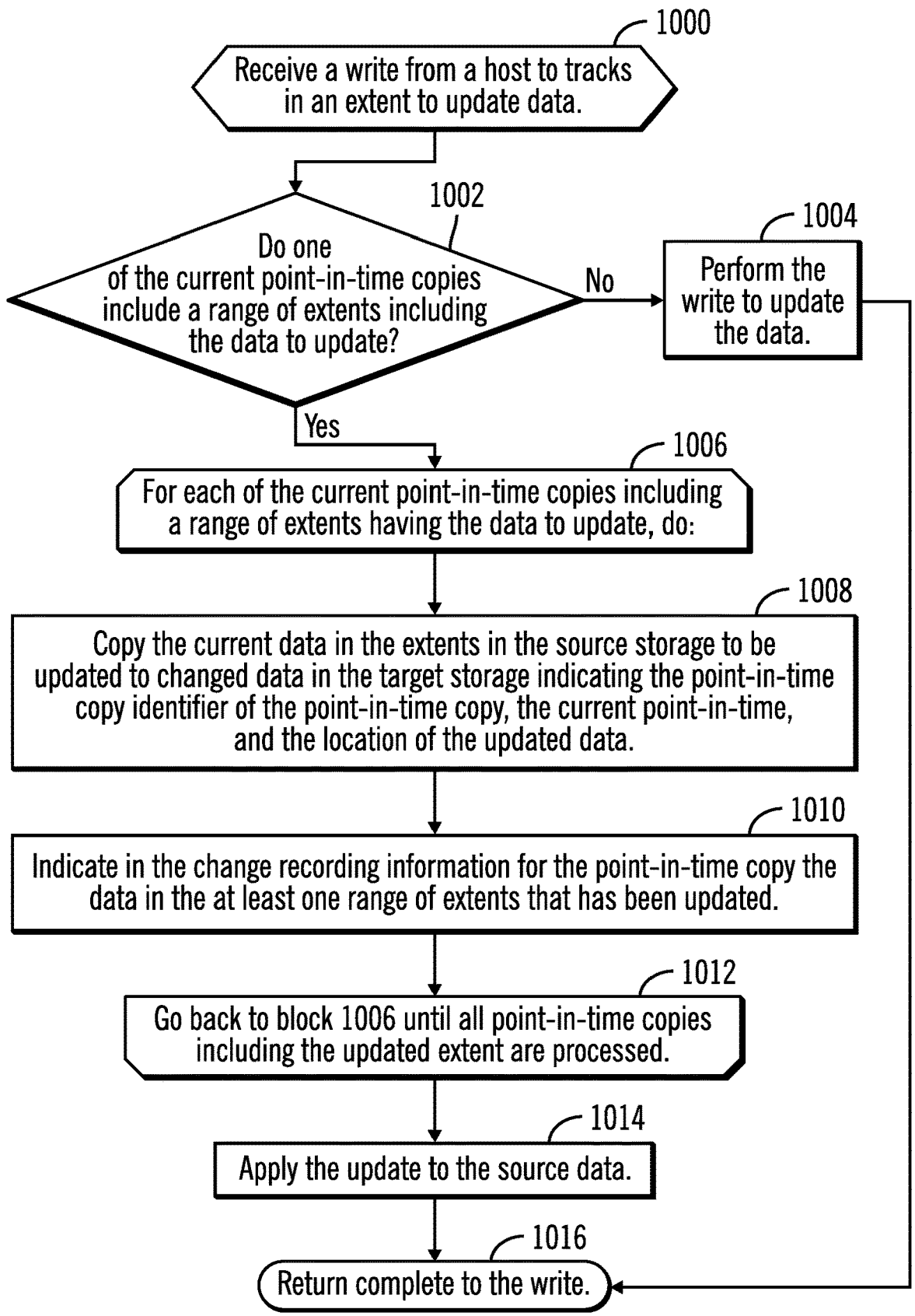
FIG. 10 illustrates an embodiment of operations to process a write request.

FIG. 10 illustrates an embodiment of operations performed by the operating system 118 to handle a write request to the source storage 102. Upon receiving (a block 1000) a write from a host 106 to one of the tracks in an extent 110 to update data, a determination is made (at block 1002) as to whether one of the current point-in-time copies $200_i$ includes a range of extents 208 including the data to update. If not, then the write is performed (at block 1004) to update the data. If (at block 1002) there is a current point-in-time copy $200_i$ associated with at least one range of extents including the data to update, then a loop of operations is performed at block 1006 through 1012 for each of the current point-in-time copies 200 including a range of extents 208 having the data to update. At block 1008, the operating system 118 copies the current point-in-time data in the extents in the source storage to be updated to changed data $300_i$ in the target storage 108 indicating the point-in-time copy identifier 302 of the point-in-time copy, the current point-in-time 304, and the location 306 of the updated data in the source storage 102. The operating system 118 or other component indicates (at block 1010) in the change recording information 206 for the point-in-time copy the data in the at least one range of extents that has been updated. After copying over the data to be updated on the write, the update is applied (at block 1014). After writing the data at block 1004 or 1014, complete is returned (at block 1016) to the write.

Figure 11:
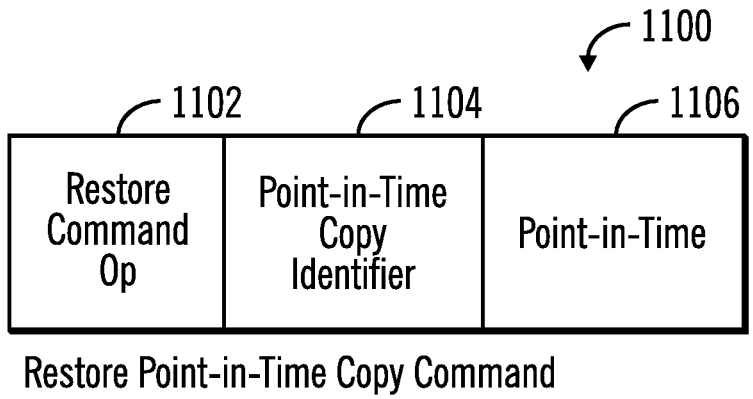
FIG. 11 illustrates an embodiment of a restore point-in-time copy command.

FIG. 11 illustrates an embodiment of a restore point-in-time copy command 1100 to restore source extents 110 as of a point-in-time for a point-in-time copy $200_i$, and includes a restore command operation code 1102; a unique point-in-time copy identifier 1104; and a point-in-time copy 1106 for the point-in-time copy identifier 1104 to restore. that may be generated by the host point-in-time copy manager 112.

Figure 12:
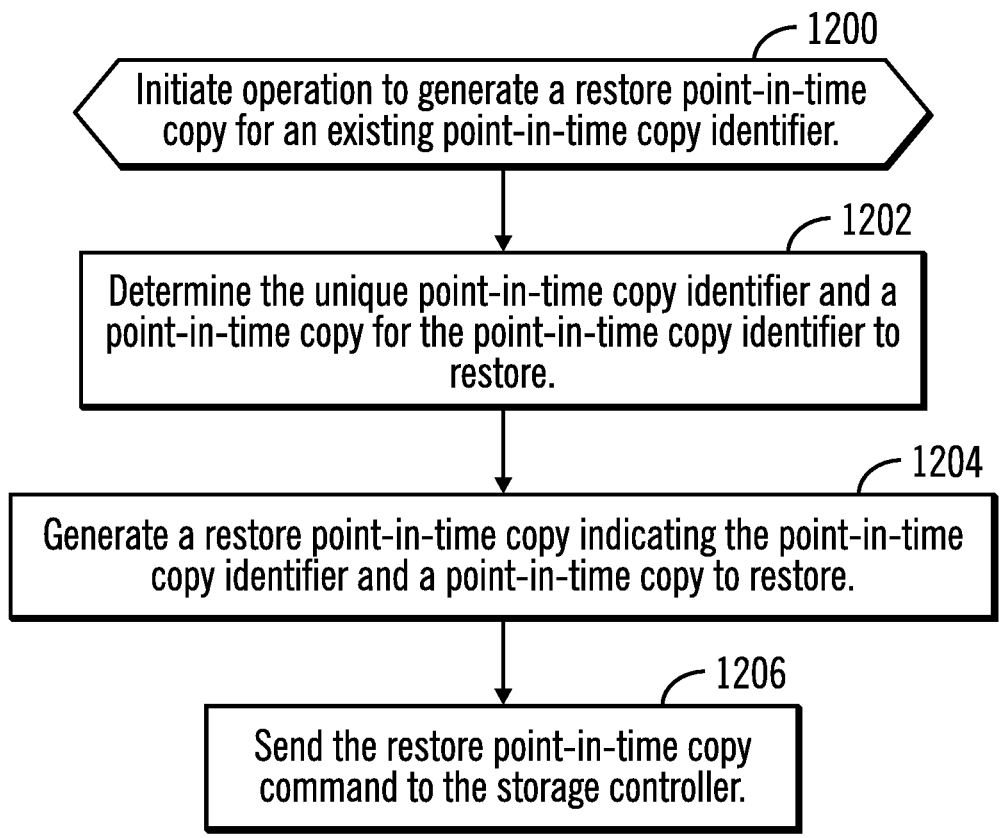
FIG. 12 illustrates an embodiment of operations to generate a restore point-in-time copy command.

FIG. 12 illustrates an embodiment of the host point-in-time copy manager 112 to generate a restore point-in-time copy command 1100. Upon initiating (at block 1200) an operation to generate a restore point-in-time copy for an existing point-in-time copy identifier 202, the host point-in-time copy manager 112 determines (at block 1202) the unique point-in-time copy identifier 202 and a point-in-time copy $200_i$ for the point-in-time copy identifier 202 to restore. The host point-in-time copy manager 112 generates (at block 1204) a restore point-in-time copy command 1100 indicating the restore point-in-time copy operation code 1102, the determined point-in-time copy identifier 202 in field 1104, and the determined point-in-time copy $200_i$ in field 1106 to restore. The generated restore point-in-time copy command 1100 is sent (at block 1206) to the storage controller 100 to process.

With the operations of FIGS. 6, 8, and 12, the host point-in-time copy manager 112 may generate a graphical user interface in which the user may select a point-in-time copy identifier and extents for the establish 400 and incremental 500 point-in-time copy commands, and select the point-in-time copy identifier and point-in-time copy for a restore point-in-time copy command 1100. Alternatively, a user may code a script command with determined point-in-time copy identifier, extents, and/or point-in-time copy for the commands 400, 500, 1100 to then transmit to the storage controller 100.

Figure 13:
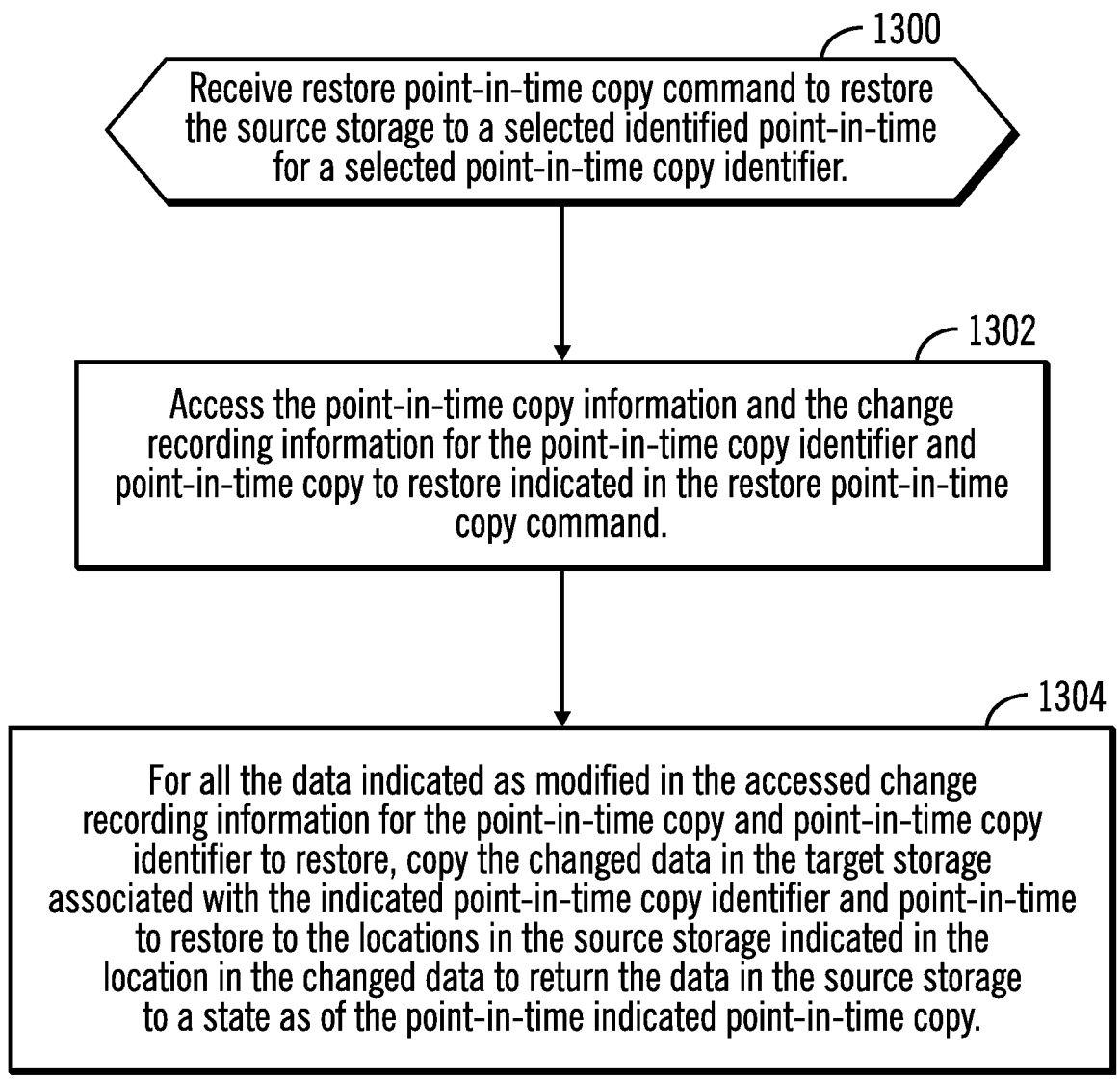
FIG. 13 illustrates an embodiment of operations to process the restore point-in-time copy command to restore extents to a previous point-in-time.

FIG. 13 illustrates an embodiment of operations performed by the point-in-time copy managers 112 and 116 to restore the source storage to a point-in-time for a point-in-time copy identifier. The host point-in-time copy manager 112 may use a user interface to determine available point-in-time copies for ranges of extents to restore. Upon receiving (at block 1300) from the host 106 a restore point-in-time copy command 1100, the storage controller point-in-time copy manager 116 accesses (at block 1302) the point-in-time copy information $200_i$ and the change recording information $206_i$ for the point-in-time copy identifier 1104 and point-in-time copy 1106 indicated in the received restore command 1100 to restore. For all the data indicated as modified in the accessed change recording information $206_i$ for the point-in-time copy $200_i$ and point-in-time copy identifier to restore, the point-in-time copy manager 116 copies (at block 1304) the changed data $300_i$ in the target storage 108 associated with the selected point-in-time copy identifier 302 and point-in-time 304 to restore to the locations in the source storage 102 indicated in the location 306 in the changed data $300_i$ to return the extents 110 in the source storage 102 to a state as of the restore point-in-time copy 1106.

Described embodiments provide techniques for a host system to specify to a storage controller selected extents of a volume, comprising less than all the extents in the volume, to include in a point-in-time copy. In this way, computational and storage resources are conserved by limiting the point-in-time copy to only those extents of data in a volume in which the user is interested in copying, not having to subject the entire volume to the point-in-time copy. A point-in-time copy is established for at least one range of extents in at least one volume for a point-in-time copy identifier, which may be generated and provided by the host initiating the point-in-time copy. Change recording information is generated indicating each of the at least one range of extents less than all of the extents in the at least one volume. Upon receiving an update to data in the at least one range of extents in the point-in-time copy, the data in the source storage in the at least one range of extents to be updated is copied as changed data to the target storage and indication is made in the change recording information for the point-in-time copy the data in the at least one range of extents that has been updated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
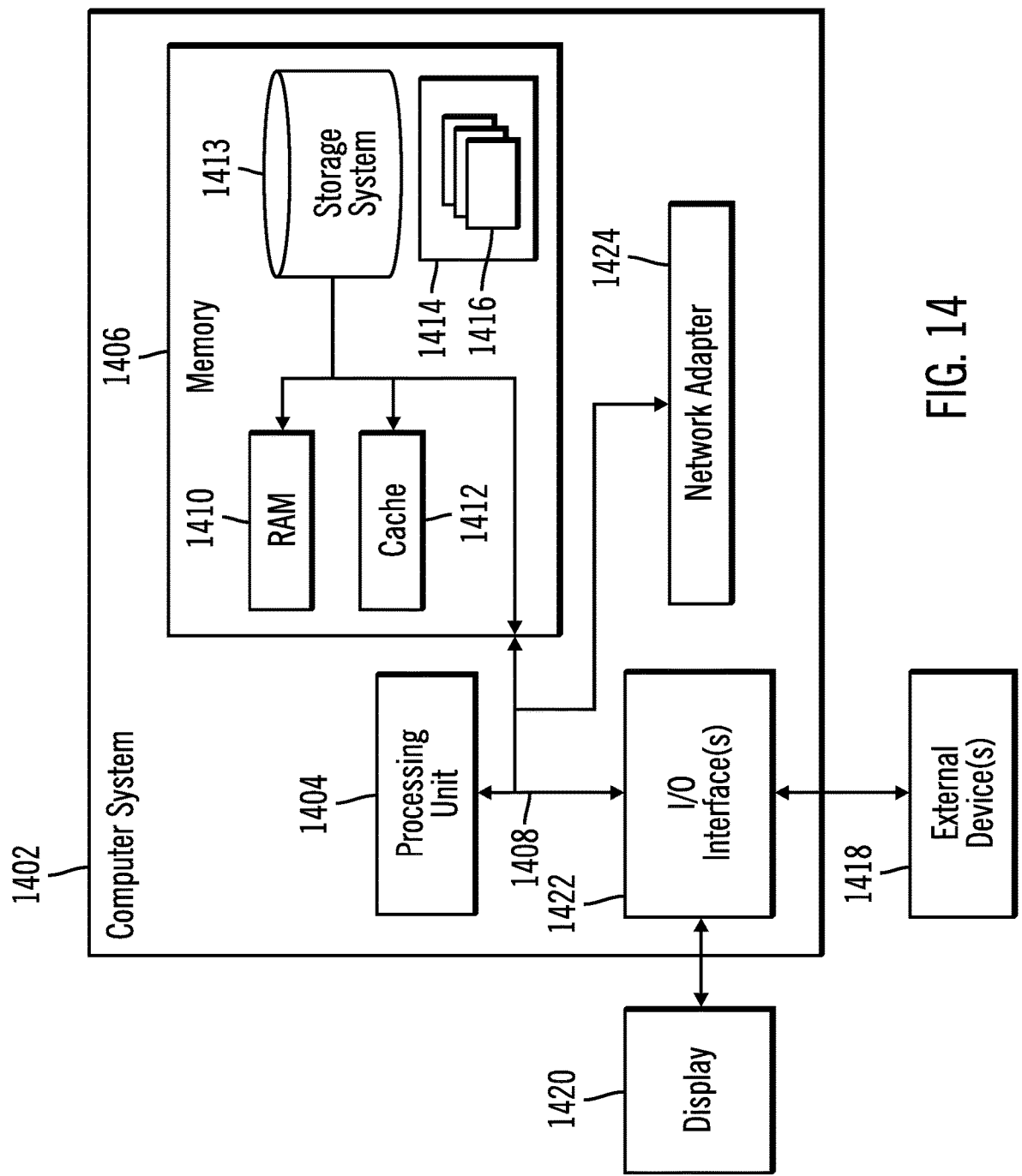
FIG. 14 illustrates a computing environment in which the components of FIG. 1 may be implemented.

The computational components of FIG. 1, including the storage controller 100 and host 106 may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a copy between a source storage and a target storage, wherein the computer program product comprises a computer readable storage medium having program instructions embodied therewith, the program instructions executable by a processor to cause operations, the operations comprising:

receiving an establish point-in-time copy command from a host including at least one range of extents in at least one volume in the source storage and a point-in-time copy identifier, wherein the host generates the point-in-time copy identifier to provide a unique identifier for a point-in-time copy to establish with the establish point-in-time copy command, wherein the at least one range of extents comprises less than all the extents included in the at least one volume;

establishing a point-in-time copy identified by the point-in-time copy identifier and for the at least one range of extents in the establish point-in-time copy command generating a change recording information indicating each of the at least one range of extents less than all of the extents in the at least one volume;

receiving an update to data in the at least one range of extents in the point-in-time copy;

copying the data in the source storage in the at least one range of extents to be updated as changed data to the target storage, wherein the changed data stored in the target storage includes the point-in-time copy identifier of the point-in-time copy for which the data is copied; and indicating in the change recording information the data in the at least one range of extents that has been updated.

2. The computer program product of claim 1, wherein the change recording information comprises a change recording bitmap including a bit for each track in each of the at least one range of extents in the point-in-time copy, wherein the bits in the change recording bitmap is initially set to indicate the tracks have not been updated.

3. The computer program product of claim 1, wherein the point-in-time copy comprises a first point-in-time copy, wherein the change recording information comprises a first change recording information, wherein the operations further comprise:

receiving from the host a modified at least one range of extents for the point-in-time copy identified with the point-in-time copy identifier, wherein the modified at least one range of extents includes at least one different extent than represented in the first change recording information currently used for the point-in-time copy identifier;

generating second change recording information for the point-in-time copy identifier for a second point-in-time copy to represent the modified at least one range of extents having different extents than in the first change recording information; and switching over to using the second change recording information to indicate data in the modified at least one range of extents in the source storage that is modified.

4. The computer program product of claim 3, wherein the modified at least one range of extents removes at least one extent, wherein the second change recording information indicates the extents in the first change recording information less the at least one extent to remove.

5. The computer program product of claim 4, wherein the operations further comprise:

before switching over to using the second change recording information, performing:

copying data in the source storage for the at least one extent being removed to the target storage and associating the copied data for the at least one extent being removed with the first point-in-time copy; and indicating in the first change recording information the data for the at least one extent being removed as modified.

6. The computer program product of claim 3, wherein the modified at least one range of extents adds at least one extent, wherein the generating the second change recording information indicates the extents in the first change recording information and the at least one extent to add from the modified at least one range of extents.

7. The computer program product of claim 3, wherein the operations further comprise:

indicating, in the second change recording information, data in extents as modified that is indicated as modified in the first change recording information.

8. The computer program product of claim 3, wherein the first point-in-time copy and first change recording information provides data as of a first point-in-time, wherein the second point-in-time copy and the second change recording information provides data as of a second point-in-time, wherein both the first and second point-in-time copies are associated with the point-in-time copy identifier, wherein the data in the source storage copied to the target storage before the data in the source storage is updated as part of the first point-in-time copy is indicated as associated with the first point-in-time copy, wherein the operations further comprise:

receiving an update to data in the at least one modified range of extents in the second point-in-time copy;

copying the data in the source storage in the modified at least one range of extents as changed data to the target storage after the second point-in-time copy;

indicating in the second change recording information the data in the modified at least one range of extents that has been updated; and associating the changed data indicated in the second change recording information with the second point-in-time copy.

9. The computer program product of claim 3, wherein the operations further comprise:

saving the first change recording information in response to switching over to using the second change recording information;

selecting a point-in-time copy comprising one of the first and second point-in-time copies to restore; and for the data indicated as modified in the first or second change recording information of the selected point-in-time copy to restore, copying the changed data in the target storage associated with the selected point-in-time copy to the source storage to return the data in the source storage to a state as of the selected point-in-time copy.

10. The computer program product of claim 1, wherein the operations further comprise:

receiving from a host an establish command indicating the at least one range of extents and the point-in-time copy identifier, wherein the establishing the point-in-time copy and generating the change recording information are performed in response to receiving the establish command.

11. The computer program product of claim 1, wherein the change recording information only indicates the at least one range of extents indicated in the establish point-in-time copy command and not extents in the at least one volume not specified in the point-in-time copy establish command.

12. A system for managing a copy between a source storage and a target storage, comprising:

a processor; and a computer readable storage medium having program instructions executed by the processor to perform operations, the operations comprising:

receiving an establish point-in-time copy command from a host including at least one range of extents in at least one volume in the source storage and a point-in-time copy identifier, wherein the host generates the point-in-time copy identifier to provide a unique identifier for a point-in-time copy to establish with the establish point-in-time copy command, wherein the at least one range of extents comprises less than all the extents included in the at least one volume;

establishing a point-in-time copy identified by the point-in-time copy identifier and for the at least one range of extents in the establish point-in-time copy command generating a change recording information indicating each of the at least one range of extents less than all of the extents in the at least one volume;

receiving an update to data in the at least one range of extents in the point-in-time copy;

copying the data in the source storage in the at least one range of extents to be updated as changed data to the target storage, wherein the changed data stored in the target storage includes the point-in-time copy identifier of the point-in-time copy for which the data is copied; and indicating in the change recording information the data in the at least one range of extents that has been updated.

13. The system of claim 12, wherein the point-in-time copy comprises a first point-in-time copy, wherein the change recording information comprises a first change recording information, wherein the operations further comprise:

receiving from host a modified at least one range of extents for the point-in-time copy identified with the point-in-time copy identifier, wherein the modified at least one range of extents includes at least one different extent than represented in the first change recording information currently used for the point-in-time copy identifier;

generating second change recording information for the point-in-time copy identifier for a second point-in-time copy to represent the modified at least one range of extents having different extents than in the first change recording information; and switching over to using the second change recording information to indicate data in the modified at least one range of extents in the source storage that is modified.

14. The system of claim 13, wherein the operations further comprise:

indicating, in the second change recording information, data in extents as modified that is indicated as modified in the first change recording information.

15. The system of claim 13, wherein the first point-in-time copy and first change recording information provides data as of a first point-in-time, wherein the second point-in-time copy and the second change recording information provides data as of a second point-in-time, wherein both the first and second point-in-time copies are associated with the point-in-time copy identifier, wherein the data in the source storage copied to the target storage before the data in the source storage is updated as part of the first point-in-time copy is indicated as associated with the first point-in-time copy, wherein the operations further comprise:

receiving an update to data in the at least one modified range of extents in the second point-in-time copy;

copying the data in the source storage in the modified at least one range of extents as changed data to the target storage after the second point-in-time copy;

indicating in the second change recording information the data in the modified at least one range of extents that has been updated; and associating the changed data indicated in the second change recording information with the second point-in-time copy.

16. The system of claim 13, wherein the operations further comprise:

saving the first change recording information in response to switching over to using the second change recording information;

selecting a point-in-time copy comprising one of the first and second point-in-time copies to restore; and for the data indicated as modified in the first or second change recording information of the selected point-in-time copy to restore, copying the changed data in the target storage associated with the selected point-in-time copy to the source storage to return the data in the source storage to a state as of the selected point-in-time copy.

17. The system of claim 12, wherein the change recording information only indicates the at least one range of extents indicated in the establish point-in-time copy command and not extents in the at least one volume not specified in the point-in-time copy establish command.

18. A method for managing a copy between a source storage and a target storage, comprising:

receiving an establish point-in-time copy command from a host including at least one range of extents in at least one volume in the source storage and a point-in-time copy identifier, wherein the host generates the point-in-time copy identifier to provide a unique identifier for a point-in-time copy to establish with the establish point-in-time copy command, wherein the at least one range of extents comprises less than all the extents included in the at least one volume;

establishing a point-in-time copy identified by the point-in-time copy identifier and for the at least one range of extents in the establish point-in-time copy command generating a change recording information indicating each of the at least one range of extents less than all of the extents in the at least one volume;

receiving an update to data in the at least one range of extents in the point-in-time copy;

copying the data in the source storage in the at least one range of extents to be updated as changed data to the target storage, wherein the changed data stored in the target storage includes the point-in-time copy identifier of the point-in-time copy for which the data is copied; and indicating in the change recording information the data in the at least one range of extents that has been updated.

19. The method of claim 18, wherein the point-in-time copy comprises a first point-in-time copy, wherein the change recording information comprises a first change recording information, further comprising:

receiving from the host a modified at least one range of extents for the point-in-time copy identified with the point-in-time copy identifier, wherein the modified at least one range of extents includes at least one different extent than represented in the first change recording information currently used for the point-in-time copy identifier;

generating second change recording information for the point-in-time copy identifier for a second point-in-time copy to represent the modified at least one range of extents having different extents than in the first change recording information; and switching over to using the second change recording information to indicate data in the modified at least one range of extents in the source storage that is modified.

20. The method of claim 19, further comprising:

indicating, in the second change recording information, data in extents as modified that is indicated as modified in the first change recording information.

21. The method of claim 19, wherein the first point-in-time copy and first change recording information provides data as of a first point-in-time, wherein the second point-in-time copy and the second change recording information provides data as of a second point-in-time, wherein both the first and second point-in-time copies are associated with the point-in-time copy identifier, wherein the data in the source storage copied to the target storage before the data in the source storage is updated as part of the first point-in-time copy is indicated as associated with the first point-in-time copy, further comprising:

receiving an update to data in the at least one modified range of extents in the second point-in-time copy;

copying the data in the source storage in the modified at least one range of extents as changed data to the target storage after the second point-in-time copy;

indicating in the second change recording information the data in the modified at least one range of extents that has been updated; and associating the changed data indicated in the second change recording information with the second point-in-time copy.

22. The method of claim 19, further comprising:

saving the first change recording information in response to switching over to using the second change recording information;

selecting a point-in-time copy comprising one of the first and second point-in-time copies to restore; and for the data indicated as modified in the first or second change recording information of the selected point-in-time copy to restore, copying the changed data in the target storage associated with the selected point-in-time copy to the source storage to return the data in the source storage to a state as of the selected point-in-time copy.

23. The method of claim 18, wherein the change recording information only indicates the at least one range of extents indicated in the establish point-in-time copy command and not extents in the at least one volume not specified in the point-in-time copy establish command.

* * * * *